United States Patent [19]

Adoline

[11] Patent Number: 5,090,989
[45] Date of Patent: Feb. 25, 1992

[54] AIR OPERATED LOCATING SYSTEM FOR ORIENTING GLASS SHEET ON GLASS SHEET SHAPING TOOL

[75] Inventor: Jack W. Adoline, Toledo, Ohio
[73] Assignee: Glasstech, Inc., Perrysburg, Ohio
[21] Appl. No.: 599,036
[22] Filed: Oct. 17, 1990
[51] Int. Cl.⁵ ............................................. C03B 23/023
[52] U.S. Cl. ...................................... 65/273; 65/107; 65/169; 65/289
[58] Field of Search ................. 65/107, 273, 289, 160, 65/161

[56] References Cited

U.S. PATENT DOCUMENTS

| | | | |
|---|---|---|---|
| 4,670,036 | 6/1987 | Enk et al. | 65/107 X |
| 4,775,404 | 10/1988 | Klempner et al. | 65/273 |
| 4,802,904 | 2/1989 | Boutier et al. | 65/273 X |
| 4,927,443 | 5/1990 | Honjo et al. | 65/273 |
| 4,985,059 | 1/1991 | Letemps et al. | 65/273 X |

*Primary Examiner*—Robert L. Lindsay
*Attorney, Agent, or Firm*—Brooks & Kushman

[57] ABSTRACT

An apparatus (10) for orienting a glass sheet (12) on a glass sheet shaping mold (16) is disclosed as including a plurality of air actuated cylinders (32) mounted on the mold (16). Each cylinder (32) includes a glass sheet nester (34) that is actuable by cylinder (32) between a raised position, above the mold (16) for locating the glass sheet (12) with the cooperable operation of backgate assembly (24) as the glass sheet (12) moves along a topside support device (14), and a lowered position, below the mold surface (26) whereby the glass sheet (12) can be deposited on the mold (16) for forming.

6 Claims, 2 Drawing Sheets

AIR OPERATED LOCATING SYSTEM FOR ORIENTING GLASS SHEET ON GLASS SHEET SHAPING TOOL

TECHNICAL FIELD

This invention relates to an air operated locating system for orienting glass sheets on a glass sheet shaping tool which has particular utility when used in connection with glass sheet forming systems using a topside support device.

BACKGROUND ART

In my earlier U.S. Pat. No. 4,775,404, I disclosed an improvement for registering a glass sheet on a glass sheet shaping tool which included the use of a plurality of glass sheet locators mounted on a mold. The locators therein are mechanically actuated by the cooperable operation of a plurality of connectors and linkages. Counterweights are cooperable with the linkages to compensate for overtravel and to limit vertical movement of the locators.

This improvement was a great advance over the earlier use of a mechanical stop mounted relative to a topside support device to position glass sheets with the cooperable employment of a backgate assembly prior to the glass sheets being deposited on a forming mold. However, the construction and use of a plurality of connectors and linkages is complicated, and requires regular maintenance. Furthermore, my earlier invention can still be improved upon.

DISCLOSURE OF INVENTION

An object of the present invention is to provide a simplified system for locating a glass sheet with respect to a glass sheet shaping tool.

A further object of the invention is to provide an improved locating system which utilizes compressed air and eliminates the cumbersomeness of mechanical connectors and linkages associated with conventional systems.

In carrying out the above objects and other objects of the invention, the system includes a topside support device having a downwardly facing surface located adjacent to and extending away from a heating conveyor for conveying a heated glass sheet in a plane of conveyance. The support device is at an elevation just slightly above the plane of conveyance and receives the heated glass sheet from the heating conveyor. The topside support device is located above a movable mold having a curved mold surface. The movable mold is reciprocally positional below the topside support device to receive the heated glass sheet from the topside support device.

The improvement includes a plurality of glass sheet locators defined by air actuated cylinders mounted on the mold. Each air actuated cylinder includes a vertically movable nester for nesting or positioning the moving glass sheet. Each nester is vertically movable by the actuation of the air cylinder to a raised position above the mold. In the raised position, the nesters locate the glass sheet with the cooperable operation of the backgate as the glass sheet moves along the topside support device thereby positioning the glass sheet relative to the topside support device and mold. The nesters are also movable by actuation of the air cylinders to a lowered position, below the curved mold surface, whereby the glass sheet can subsequently be accurately deposited on the mold by the topside support device in preparation for the forming operation.

In the preferred embodiment of the invention, each nester is defined by a disk oriented in a horizontal plane that engages the glass sheet in the plane of conveyance. Each disk is rotatable about a vertical axis to provide a rolling contact with the edge of the glass sheet during the engagement.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
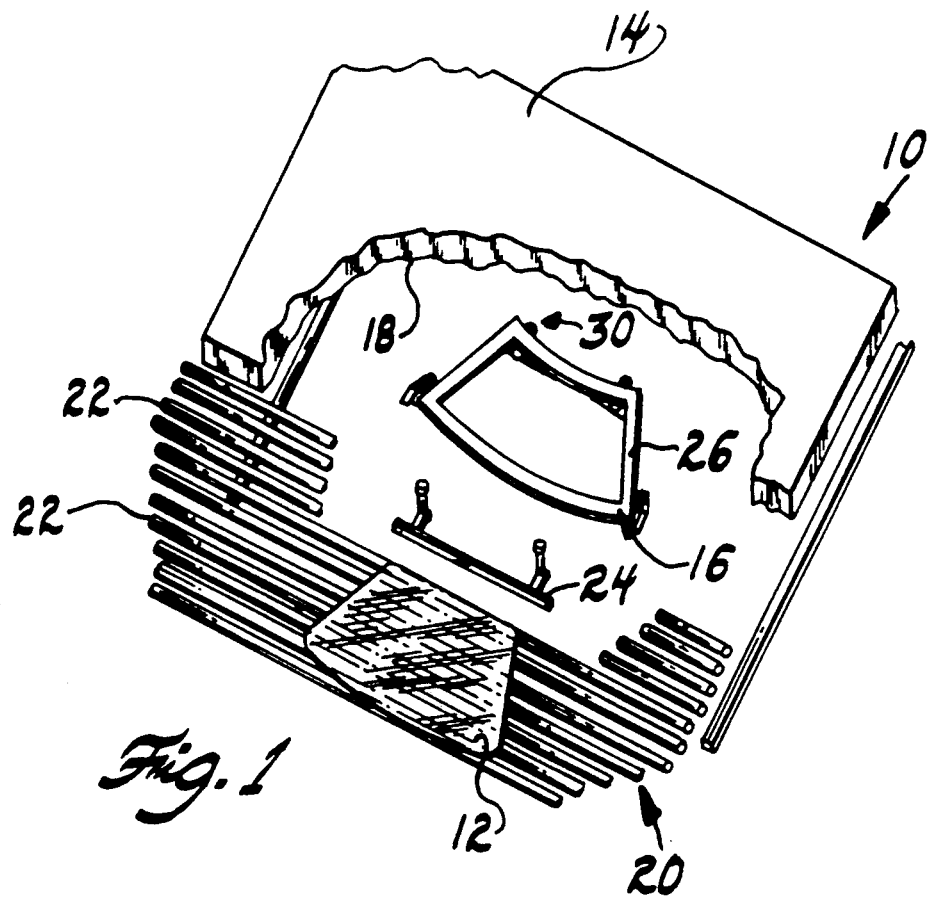
FIG. 1 is a perspective view of an air operated locating system for orienting a glass sheet on a glass sheet shaping mold, the system being constructed in accordance with the present invention.

Referring to FIG. 1 of the drawings, an apparatus constructed in accordance with the present invention is generally indicated by reference numeral 10 and is used for positioning a heated glass sheet 12 relative to a topside support device 14 and glass sheet shaping mold 16 located below the topside support device for subsequent accurate registration of the glass sheet on the mold. The mold 16, referred to hereinafter, is a perimetering female mold which cooperates with a full surface male mold, not shown, for subsequent forming of the glass sheet 12.

FIG. 1 illustrates a glass sheet forming system including a topside support device 14 having a downwardly facing surface 18 located adjacent to and extending away from heating conveyor 20. The heating conveyor 20 includes conveyor rolls 22 and also a glass positioning backgate 24. The support device 14 is at an elevation just slightly above the conveyor rolls 22 to receive the heated glass sheet 12 from the heating conveyor 20. The glass sheet 12 is supported on the topside support device 14 by vacuum pressure. The topside support device 14 is located above movable mold 16 which has a curved mold surface 26. The mold 16 is reciprocally positionable below topside support device 14 to receive the heated glass sheet 12 from the topside support device after the glass sheet has been accurately located on the support device with respect to the mold.

With further reference to FIG. 1, the improvement comprises a plurality of glass sheet locators 30 mounted on the mold 16. Each locator 30 includes an air actuated cylinder 32, of conventional piston and cylinder design, and a glass sheet nester 34 mounted on the cylinder. Each nester 34 is vertically movable by the actuation of the air actuated cylinder 32 between a raised position, above the mold 16 for locating the glass sheet 12 with respect to the topside support device 14 and mold 16 and a lowered position below the curved mold surface 26.

Each cylinder 32 includes an exhaust port 36 located near the cylinder base which allows air to be exhausted quickly to allow the nesters 34 to be lowered quickly. The exhaust ports 36 are directed away from the glass sheet 12 so that the exhaust air does not affect the temperature of the glass sheet. With the cooperable operation of the backgate assembly 24, as hereinafter described, the glass sheet 12 is positionable as it moves along the topside transfer platen 14 and it can be accurately deposited on the mold 16 by the termination of the vacuum in the topside support device 14 in preparation for a subsequent forming operation.

Figure 2:
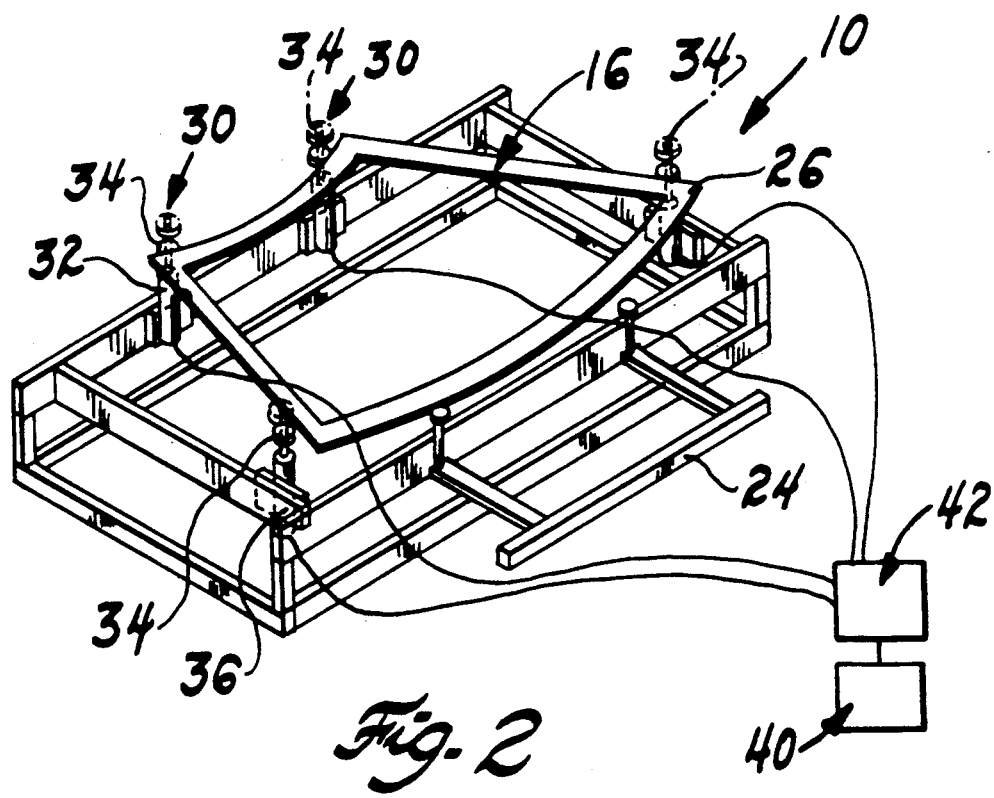
FIG. 2 is a perspective view of the glass sheet shaping mold having air actuated glass sheet locators including vertically movable glass sheet nesters mounted thereon and illustrating the vertical movement of the glass sheet nesters.

An air supply system 40, shown schematically in FIG. 2, supplies air to the air actuated cylinders 32. Air is supplied in the range of 5-10 psi which is sufficient for actuation of nesters 34 and of small enough volume whereby leakage of air from the cylinders will not effect the edge of the glass sheet 12.

With reference to FIGS. 1 through 4 of the drawings, each nester 34 is defined by a disk oriented in an horizontal plane. Each disk 34 is rotatable about a vertical axis and engageable with the edge of the glass sheet 12. Each disk 34 thereby provides rolling contact with the edge of the glass sheet 12 during the engagement and provides proper orientation of the glass sheet with respect to the shaping mold 16.

Figure 3:
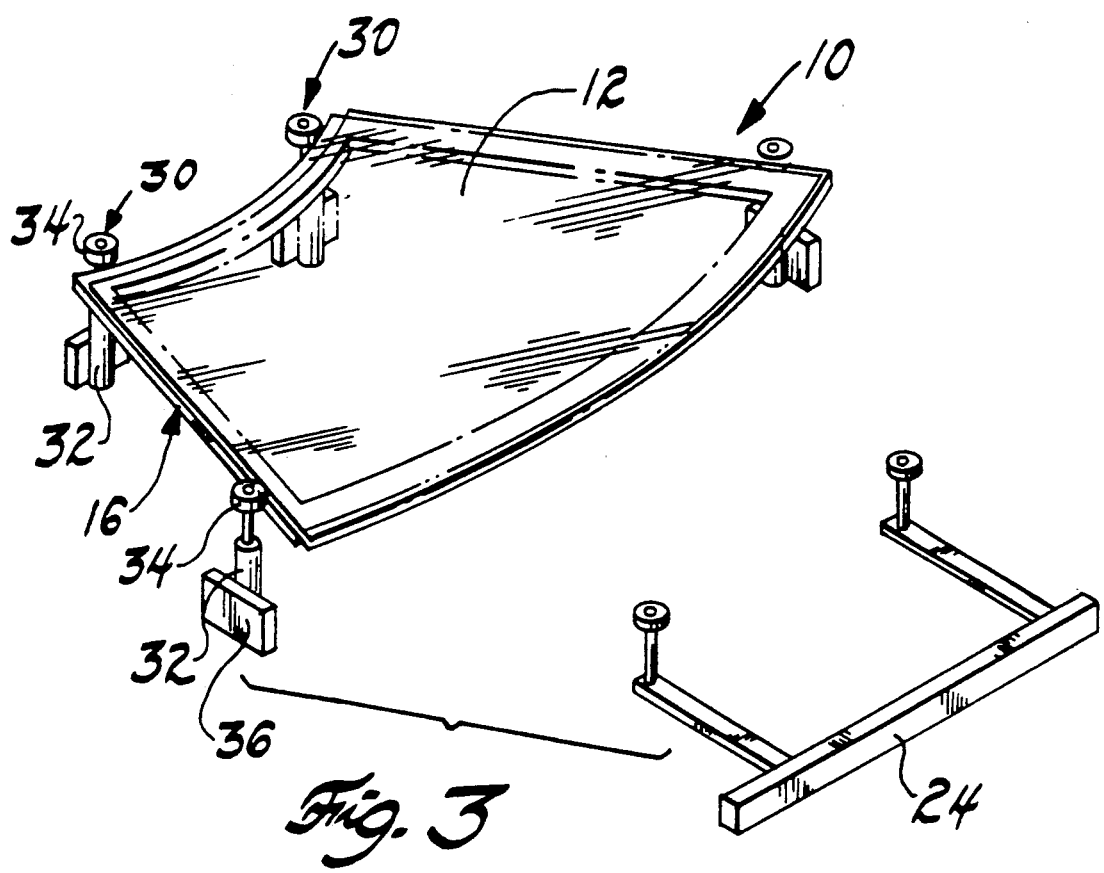
FIG. 3 is a perspective schematic view of a the shaping mold and a backgate assembly illustrating the glass sheet prior to being oriented with respect to the glass sheet shaping mold.
Figure 4:
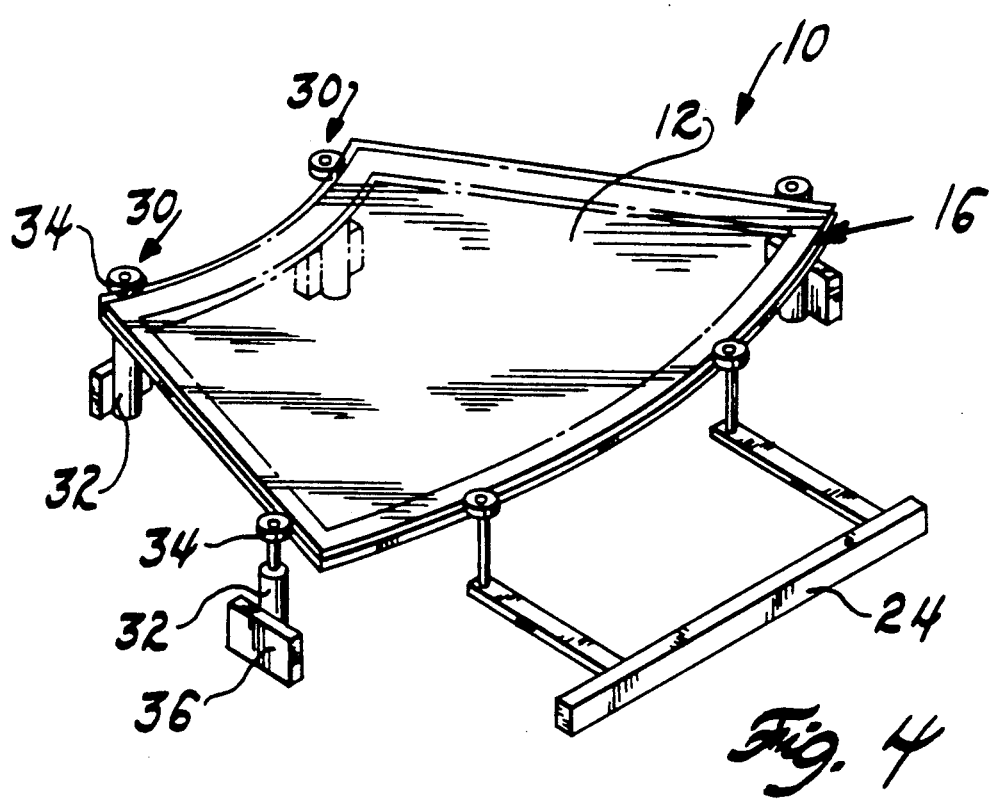
FIG. 4 is a perspective schematic view of the locators and backgate assembly orienting the glass sheet with respect to the glass sheet shaping mold.

FIGS. 3 and 4 illustrate in sequential steps the operation of the apparatus 10. In FIG. 3 of the drawings, glass sheet 12 is shown moving in a direction of glass sheet conveyance above mold 16. The glass sheet 12 is supported by the topside support device 14, not shown, and is moving as a result of the momentum of the glass sheet's movement on the conveyor rolls 22 during the conveyance. As the glass sheet 12 is nearing a position above mold 16, the air actuated cylinders 32 are actuated by a controller 42, schematically illustrated in FIG. 2, and being of the mechanical or computer controlled type, to raise the nesters 34 above the curved mold surface 26 of the mold 16 whereby the nesters are introduced into the plane of conveyance of the glass sheet 12 to engage the glass sheet. The backgate assembly 24 is then brought in behind the glass sheet 12 as shown in FIG. 4 and is moved to urge the glass sheet in the direction of conveyance into engagement with the nesters 34.

The cooperation of the nesters 34 and backgate assembly 24 aligns the glass sheet 12 with respect to the topside support device 14 and movable mold 16. Subsequently, the air actuated cylinders 32 are actuated to lower the nesters 34 below the curved mold surface 26 of the movable mold 16 and the vacuum is terminated on the topside support device 14 to release the glass sheet onto the curved mold surface. The glass sheet 12 is now accurately positioned on the curved surface 26 of the movable mold 16 for forming.

While the best mode for carrying out the invention has been described in detail, those familiar with the art to which this invention relates will recognize various alternative designs and embodiments for practicing the invention as defined by the following claims.

What is claimed is:

1. In a glass sheet forming system including a topside support device having a downwardly facing surface located adjacent to and extending away from a heating conveyor for conveying a heated glass sheet in a plane of conveyance and a glass positioning backgate, the support device being at an elevation just slightly above the plane of conveyance to receive the heated glass sheet from the heating conveyor, the topside support device being located above a moveable mold having a curved mold surface that is reciprocally positional below the topside support device to receive the heated glass sheet from the topside support device, the improvement comprising: a plurality of glass sheet locators mounted on the mold; each locator including an air actuated cylinder having a glass sheet nester mounted thereon; said nester being movable by the actuation of said air actuated cylinder between a raised position, above the mold for locating the glass sheet with the cooperable operation of the backgate as the glass sheet moves along the topside support device for aligning the glass sheet for subsequent accurate registration with the curved mold surface, and a lowered position, below the curved mold surface, whereby the glass sheet can be accurately deposited thereon by the topside support device in preparation for the forming operation.

2. An improvement as in claim 1 wherein each nester is defined by a disc oriented in a horizontal plane that engages the glass sheet.

3. An improvement as in claim 2 wherein each disc is rotatable about a vertical axis thereby providing rolling contact with the edge of the glass sheet during the engagement.

4. An improvement as in claim 1 further including a controller for controlling a sequential actuation of said actuator.

5. An improvement as in claim 1 further including an air supply system for supplying air to said air actuated cylinder.

6. In a glass sheet forming system including a topside support device having a downwardly facing surface located adjacent to and extending away from a heating conveyor for conveying a heated glass sheet in a plane of conveyance and a glass positioning backgate, the support device being at an elevation just slightly above the plane of conveyance to receive the heated glass sheet from the heating conveyor, the topside support device being located above a moveable mold having a curved mold surface that is reciprocally positional below the topside support device to receive the heated glass sheet from the topside support device, the improvement comprising: a plurality of glass sheet locators mounted on the mold; each locator including an air actuated cylinder having a glass sheet nester mounted thereon; said nester being defined by a rotatable disc and movable by the actuation of said air actuated cylinder between a raised position, above the mold for locating the glass sheet with the cooperable operation of the backgate as the glass sheet moves along the topside support device for aligning the glass sheet for subsequent accurate registration with the curved mold surface, and a lowered position, below the curved mold surface; and a controller for controlling the sequential actuation of said actuator whereby the glass sheet can be accurately deposited on the mold by the topside support device in preparation for the forming operation.

* * * * *